United States Patent
Hedhli

(10) Patent No.: US 8,349,954 B2
(45) Date of Patent: Jan. 8, 2013

(54) POLYMERIZATION OF FLUOROPOLYMERS USING POLYCAPROLACTONE

(75) Inventor: Lotfi Hedhli, Noisy le Roi (FR)

(73) Assignee: Arkema Inc., King of Prussia, PA (US)

( * ) Notice: Subject to any disclaimer, the term of this patent is extended or adjusted under 35 U.S.C. 154(b) by 160 days.

(21) Appl. No.: 12/936,615

(22) PCT Filed: Apr. 2, 2009

(86) PCT No.: PCT/US2009/039252
§ 371 (c)(1),
(2), (4) Date: Oct. 6, 2010

(87) PCT Pub. No.: WO2009/126504
PCT Pub. Date: Oct. 15, 2009

(65) Prior Publication Data
US 2011/0034632 A1    Feb. 10, 2011

Related U.S. Application Data

(60) Provisional application No. 61/042,844, filed on Apr. 7, 2008.

(51) Int. Cl.
| C08L 67/04 | (2006.01) |
| C08L 27/12 | (2006.01) |
| C08F 2/22 | (2006.01) |
| C08F 6/22 | (2006.01) |

(52) U.S. Cl. .................................. 525/186; 524/805
(58) Field of Classification Search .................. 525/186; 524/805

See application file for complete search history.

(56) References Cited

U.S. PATENT DOCUMENTS

| 2,460,573 | A | | 2/1949 | Folt |
| 2,559,752 | A | | 7/1951 | Berry |
| 3,249,595 | A | | 5/1966 | Lederer et al. |
| 3,592,877 | A | * | 7/1971 | Mullins ..................... 525/186 |
| 4,524,197 | A | | 6/1985 | Khan |
| 5,763,552 | A | | 6/1998 | Feiring et al. |
| 5,859,123 | A | | 1/1999 | Kobavashi et al. |
| 5,925,705 | A | | 7/1999 | Araki et al. |
| 6,841,616 | B2 | | 1/2005 | Wille et al. |
| 6,869,997 | B2 | | 3/2005 | Wille et al. |
| 7,122,610 | B2 | * | 10/2006 | Wille et al. ................... 526/255 |
| 2004/0225053 | A1 | | 11/2004 | Willie et al. |
| 2005/0080210 | A1 | | 4/2005 | Jing et al. |
| 2006/0281845 | A1 | | 12/2006 | Amin-Sanavei et al. |
| 2007/0228345 | A1 | | 10/2007 | Pacetti |
| 2007/0249786 | A1 | | 10/2007 | Chapman, Jr. et al. |
| 2007/0270534 | A1 | | 11/2007 | Amin-Sanavei et al. |

* cited by examiner

*Primary Examiner* — Fred M Teskin
(74) *Attorney, Agent, or Firm* — Thomas F. Roland

(57) ABSTRACT

The present invention relates to a method for the polymerization of fluoromonomers using non-fluorinated polycaprolactone, and to the fluoropolymers formed thereby. Specifically, the method of the polymerization uses one or more polycaprolactone, or salts thereof.

11 Claims, No Drawings

POLYMERIZATION OF FLUOROPOLYMERS USING POLYCAPROLACTONE

FIELD OF THE INVENTION

The present invention relates to a method for the polymerization of fluoromonomers using non-fluorinated polycaprolactone, and to the fluoropolymers formed thereby. Specifically, the method of the polymerization uses one or more polycaprolactone or salts thereof.

BACKGROUND OF THE INVENTION

Fluoropolymers are primarily produced via heterogeneous polymerization reactions, including suspension, emulsion and microemulsion systems. Generally, each of these reactions requires at least one monomer and a radical initiator in a suitable reaction medium. In addition, emulsion polymerizations of halogen-containing monomers generally require a surfactant capable of emulsifying both the reactants and the reaction products for the duration of the polymerization reaction. The surfactant of choice in the synthesis of fluoropolymers is generally a perfluoroalkyl surfactant. The high degree of fluorination of the surfactant avoids atom transfer between a growing polymer chain and the surfactant during polymerization, which will result in lowered molecular weights in the product and likely inhibition of the reaction. The most common perfluoroalkyl surfactant in the production of halogenated polymers is ammonium perfluorooctanoate (AFPO).

Fluorosurfactants are expensive, specialized materials, however. In addition, because of their high stability, they tend to persist in the environment. Because of their resistance to chemical degradation, fluoroalkyl surfactants have the potential to accumulate in the environment and in organisms.

New polymerization processes are needed that utilize non-perfluoroalkyl surfactants or reduced amounts of perfluoroalkyl surfactants.

Some emulsion polymerization processes have been demonstrated which employ partially fluorinated surfactants instead of perfluorinated surfactants. See U.S. Pat. Nos. 4,524,197; 5,763,552. Another attempt to reduce the amount of perfluoroalkyl surfactant in heterogeneous polymerization involved a protocol wherein a conventional fluorinated surfactant was added in combination with a non-fluorinated hydrocarbon surfactant. However, this modification served to substantially lower the rate of the reaction. See, WO 95-08598A, the entire disclosure of which is incorporated herein by reference.

Another attempt to reduce the amount of perfluoroalkyl surfactant in heterogeneous polymerization involved adding fluorinated surfactant in combination with a non-fluorinated hydrocarbon surfactant. However, this modification served to substantially lower the rate of the reaction. See, WO 95-08598A, the entire disclosure of which is incorporated herein by reference.

U.S. Pat. No. 2,559,752 describes an aqueous colloidal dispersions of polymers. Stable aqueous colloidal dispersions of polymerized ethylenically unsaturated. organic compounds. are obtained by carrying out the polymerization in the presence of a $H_2O$-soluble polymerization initiator, such as an alkali persulfate or an aliphatic azo compound (cf. U.S. Pat. No. 2,471,959, C.A. 43, 6002g), and a polyfluorinated ionizable dispersing agent U.S. Pat. No. 6,869,997, incorporated herein by reference, describes the use of a 3-allyloxy-2-hydroxy-1-propanesulfonic acid salt as the surfactant in the preparation of a fluoropolymer.

U.S. Pat. No. 6,841,616 incorporated herein by reference, describes the use of a siloxane, based surfactant as the surfactant in the preparation of a fluoropolymer.

None of the art references described above mentions the use of non-fluorinated polycaprolactone, or their salts, as surfactants in the synthesis of fluorinated polymers.

Surprisingly it was found that polycaprolactone and its salts may be used as stabilizers in the synthesis of fluorinated polymers, and thereby eliminate the use of fluorinated surfactants, or any surfactant.

SUMMARY OF THE INVENTION

The invention relates to a process for preparing a fluoropolymer in an aqueous reaction medium comprising:
a) forming an aqueous emulsion comprising at least one free radical initiator, at least one polycaprolactone or salt thereof, and at least one fluoromonomer, and
b) initiating polymerization of said fluoromonomer, The invention further relates to a fluoropolymer resin formed in an aqueous medium in the presence of at least one polycaprolactone polymer or the salts thereof.

The invention further relates to a fluoropolymer composition having a low level (0.0001 to 2 wt percent) of polycaprolactone.

DETAILED DESCRIPTION OF THE INVENTION

The invention relates to the polymerization of fluoropolymers in presence of polycaprolactone and the salts thereof.

In the process of the invention, a polymerization reaction is carried out by charging a reactor with water (preferably deionized water), at least one polycaprolactone, at least one fluoromonomer and optionally, a chain-transfer agent and an antifoulant. Alternatively, the polycaprolactone may be polymerized from the monomer in-situ, followed by addition of the fluoromonomer and optional ingredients. Air may be purged from the reactor prior to the introduction of the fluoromonomer. Water is added to the reactor before bringing the reactor to the desired starting temperature. Other materials may be added before or after bringing the reactor to temperature. At least one radical initiator is added to start and maintain the polymerization reaction. Optionally additional monomer may be added to replenish monomer that is consumed, and the other materials may be optionally added during the course of the polymerization to maintain the reaction and control the final product properties.

Polycaprolactone

Polycaprolactone is a biodegradable polymer with melting point around 60° C. and a glass transition temperature about −60° C. It is often prepared by ring opening polymerization of ε-caprolactone.

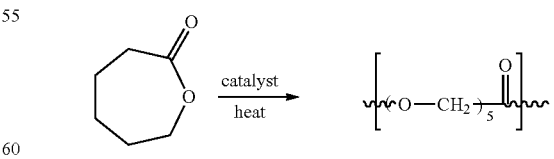

It was found in this invention that polycaprolactone or its salts may be used instead of fluorinated surfactants in the synthesis of fluorinated polymers, and thereby eliminate the use of fluorinated surfactants. The fluoropolymer synthesis may also occur in the presence of the low levels of polycaprolactone without any surfactant at all.

The polycaprolactone polymer molecular weight used in this invention can be comprised between 200 and 300 000. Preferably between 200 and 50 000. More preferably between 200 and 8 000. It can be containing a functional end group such as acid or alcohol group. It can be a copolymer containing caprolactone monomer units and monomer units of at least one other monomer. Useful copolymers of caprolactone contain at least 75 weight percent of caprolactone units, and preferably at least 90 weight percent of caprolatone units. In one embodiment, the copolymer contains caprolactone and acrylic acid monomer units.

PCL can be used in an amount from about 0.001 to about 2.0 weight percent on total monomer, and preferably at from about 0.001 to about 0.2 weight percent on total monomer. PCL may be used in solution such as in solvent solution for convenient handling, or added as solid powder or pellets.

Surfactants may optionally be used with the PCL, though a surfactant-free stable emulsion can be produced with PCL as the sole stabilizer. Useful surfactants include both fluorinated and non-fluorinated surfactants. Preferred surfactants are non-fluorinated hydrocarbon surfactants, a siloxane surfactant or a combination thereof. For example PCL can be used in combination with, sodium octyl sulfonate, sodium lauryl sulfate, ammonium lauryl sulfate, sodium laureth sulfate.

Fluoromonomers

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The fluoropolymer preferably contains at least 50 mole percent of one or more fluoromonomers.

Fluoromonomers useful in the practice of the invention include, for example, vinylidene fluoride ($VF_2$), tetrafluoroethylene (TFE), trifluomethylene, chlorotrifluoroethylene (CTFE), hexafluoropropene (HFP), vinyl floride, hexafluoroisobutylene, perfluorobutylethylene (PFBE), pentafluompropene, 3,3,3-trifluoro-1-propene, 2-trifluoromethyl-3,3,3-trifluoropropene a fluorinated vinyl ether, a fluorinated allyl ether, a fluorinated dioxole, and combinations thereof.

Especially preferred copolymers made by the process of the invention are copolymers of VDF with HFP, TFE or CTFE, comprising from about 50 to about 99 weight percent VDF, more preferably from about 70 to about 99 weight percent VDF.

Especially preferred terpolymers are the terpolymer of VDF, HFP and TFE, and the terpolymer of VDF, trifluoroethene, and TFE. The especially preferred terpolymers have at least 10 weight percent VDF, and the other comonomers may be present in varying portions, but together they comprise up to 90 weight percent of the terpolymer.

Initiators

The term "initiator" and the expressions "radical initiator" and "free radical initiator" refer to a chemical that is capable of providing a source of free radicals, either induced spontaneously, or by exposure to heat or light. Examples of initiators include peroxides, peroxydicarbonates and azo compounds. The term expression also includes redox systems useful in providing a source of free radicals. The term "radical" and the expression "free radical" refer to a chemical species that contains at least one unpaired electron.

The radical initiator is added to the reaction mixture in an amount sufficient to initiate and maintain the polymerization reaction at a desired reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) is from about 0.002 to about 1.0 weight percent.

The radical initiator may comprise an organic peroxide such as an alkyl, dialkyl, or diacyl peroxide, peroxydicarbonate, and peroxy ester in an amount from about 0.5 to about 2.5 weight percent on total monomer.

Chain-Transfer Agents

Chain-transfer agents are added to the polymerization to regulate the molecular weight of the product. They may added to a polymerization in a single portion at the beginning of the reaction, or incrementally or continuously throughout the reaction. The amount and mode of addition of chain-transfer agent depend on the activity of the particular chain-transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Examples of chain transfer agents useful in the present invention include, but are not limited to oxygenated compounds such as alcohols, carbonates, ketones, esters, and ethers may serve as chain-transfer agents; halocarbons and hydrohalocarbons, such as chlorocarbons, hydrochlorocarbons, chlorofluorocarbons and hydrochlorofluorocarbons; ethane and propane.

Buffering Agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers. A "phosphate buffer" is a salt or salts of phosphoric acid. An "acetate buffer" is a salt of acetic acid.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction.

Antifoulant

The addition of a paraffin wax or hydrocarbon oil to the reaction serves as an antifouling to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm$^2$ of the reactor interior surface area.

Polymerization Conditions

The temperature used for polymerization may vary from 20-160 degrees Celsius, depending on the initiator system chosen. The polymerization temperature is preferably from 35-130 degrees Celsius, and most preferably from 65-130 degrees Celsius. In one embodiment, the temperature is varied during the reaction.

The pressure used for polymerization may vary from 280-20,000 kPa, depending on the capabilities of the reaction equipment, the initiator system chosen, and the monomer selection. The polymerization pressure is preferably from 2,000-11,000 kPa, and most preferably from 2,750-6,900 kPa.

The polymerization occurs under stirring. The stirring may be constant, or may be varied to optimize process conditions during the course of the polymerization. In one embodiment, both multiple stirring speeds and multiple temperatures are used for controlling the reaction.

According to one embodiment of the process of the invention, a pressurized polymerization reactor equipped with a stirrer and heat control means is charged with water, preferably deionized water, one or more PCL of the invention and at least one fluoromonomer. The mixture may optionally contain one or more of an additional non-fluorinated surfactant, a buffering agent, an antifoulant and a chain-transfer agent for molecular weight regulation of the polymer product.

Prior to introduction of the monomer or monomers, air is preferably removed from the reactor in order to obtain an oxygen-free environment for the polymerization reaction.

The order in which the polymerization components are assembled may be varied, provided that the surfactant of the invention is present in the aqueous reaction medium prior to the initiation of the polymerization of the fluoromonomer. An additional amount of surfactant may be fed to the reactor during the reaction.

In one embodiment, water, initiator, PCL and optionally surfactants and antifoulant, chain transfer agent and buffer are charged to the reactor, and the reactor heated to the desired reaction temperature. The flouromonomer(s) is then fed into the reactor, preferably at a rate which provides an essentially constant pressure.

Alternatively the fluoromonomer and initiator can be fed to the reactor, along with one or more of the optional ingredients. Other variations for fluoropolymer polymerization processes are anticipated, as known in the art.

The reactor pressure is primarily regulated by controlling the feed of gaseous monomer to the reaction. The reaction pressure is typically from about 280 to about 20,000 kPa, preferably from about 2,000 to about 11,000 kPa, more preferably from about 2,750 to about 6,900 kPa.

The monomer feed is terminated when the desired weight of monomer has been fed to the reactor. Additional radical initiator is optionally added, and the reaction is allowed to react out for a suitable amount of time. The reactor pressure drops as the monomer within the reactor is consumed.

Upon completion of the polymerization reaction, the reactor is brought to ambient temperature and the residual unreacted monomer is vented to atmospheric pressure. The aqueous reaction medium containing the fluoropolymer is then recovered from the reactor as a latex. The latex consists of a stable mixture of the reaction components, i.e., water, PCL, initiator (and/or decomposition products of the initiator) and fluoropolymer solids.

Generally, the latex contains from about 10 to about 50 weight percent polymer solids. The polymer in the latex is in the form of small particles having a size range of from about 30 nm to about 800 nm.

The product of the polymerization is a latex which can be used in that form, usually after filtration of solid byproducts from the polymerization process, or which can be coagulated to isolate the solids, which may then be washed and dried. For use in latex form, the latex can be stabilized by the addition of further surfactant, which may be the same or a different ionic surfactant, or may be of a different type, such as an non-ionic surfactant. For solid product, the latex may be coagulated mechanically or by the addition of salts or acids, and then isolated by well-known means such as by filtration. Once isolated, solid product can be purified by washing or other techniques, and it may be dried for use as a powder, which can be further processed into granules.

The finished flouropolymer of the invention will generally contain small levels of the polycaprolactone, in the range of 0.0001 weight percent to 2 weight percent, preferably from 0.001 to 1 weight percent and more preferably from 0.001 to 0.5 weight percent, based on the total weight of the fluoropolymer and polycaprolactone solids.

EXAMPLES

Deionized water was used. Reagents were of ACS reagent grade quality unless stated otherwise.

Example 1

Vinylidene fluoride homopolymer made using PCL (from Aldrich, 98%), and potassium persulfate as initiator. Potassium persulfate (KPS) solution was prepared using 1.0 g of KPS (99% from Aldrich) and 99.0 g of deionized water. To a 2 Liter, stainless steel reactor was added 850 g of water, 1.0 g of PCL. The mixture was purged with argon and agitated for 0.5 hours. The reactor was sealed, agitation was continued, and the reactor was heated to 83 degrees Celsius. The reactor was charged with 142 g of vinylidene fluoride. The reactor temperature stabilized at 83 degrees Celsius, with the reactor pressure at 4500 kPa. Then 31.4 g of the KPS initiator solution was fed to the reactor. The reaction temperature was held at 83 degrees Celsius, and the reaction pressure was maintained at 4480 kPa by adding as needed vinylidene fluoride. After 60 minutes, the feed of vinylidene fluoride was stopped. For a period of 20 minutes, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solid polymer yield to be 27.8 wt %.

Example 2

Vinylidene fluoride homopolymer made using PCL (from Aldrich, 98%), and potassium persulfate as initiator. Potassium persulfate (KPS) solution was prepared using 2.0 g of KPS (99% from Aldrich) and 198.0 g of deionized water. To a 2 Liter, stainless steel reactor was added 799 g of water, 1.0 g of PCL. The mixture was purged with nitrogen and agitated for 20 minutes. The reactor was sealed, agitation was continued, and the reactor was heated to 83 degrees Celsius. The reactor was charged with 147 g of vinylidene fluoride. The reactor temperature stabilized at 83 degrees Celsius, with the reactor pressure at 4500 kPa. Then 17.0 g of the KPS initiator solution was fed to the reactor. The reaction temperature was held at 83 degrees Celsius, and the reaction pressure was maintained at 4450 kPa by adding as needed vinylidene fluoride. After 1.25 hours, the feed of vinylidene fluoride was stopped. For a period of 45 minutes, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solid polymer yield to be 31.5 wt %.

Example 3

Vinylidene fluoride homopolymer made using PCL (from Aldrich, 98%), and and di-n-propyl peroxydicarbonate (NPP) as initiator. An initiator emulsion consisting of 11.0 g of NPP, 350 g water and 1.0 g of Geropon 690 from Genessee Polymers was prepared. A 1 wt % aqueous surfactant solution used in this experiment—and referred to as "surfactant solution"—contained 1.0 g of sodium lauryl sulfate (Aldrich, 99%) and 99.0 g of water. To a 2 Liter, stainless steel reactor was added 800 g of water, 0.5 g of PCL and 10 g of surfactant solution. The mixture was purged with nitrogen and agitated for 20 minutes. The reactor was sealed, agitation was continued, and the reactor was heated to 83 degrees Celsius. The reactor was charged with 136 g of vinylidene fluoride. The reactor temperature stabilized at 83 degrees Celsius, with the reactor pressure at 4500 kPa. Then NPP initiator solution was fed to the reactor at 90 mL/hour until 28 g of initiator solution were added, and at 50 mL/hour through the remainder of the reaction. The reaction temperature was held at 83 degrees Celsius, and the reaction pressure was maintained at 4450 kPa by adding as needed vinylidene fluoride. After 1.25 hours, the feed of vinylidene fluoride was stopped. For a period of 45 minutes, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solid polymer yield to be 31.5 wt %.

Example 4

Vinylidene fluoride homopolymer made using PCL (from Aldrich, 98%), and potassium persulfate as initiator. Initiator Solution: An aqueous initiator solution was prepared that was 1.0 wt % in potassium persulfate. Ethyl Acetate (99.5% ACS Grade) from Aldrich was used as is. Into a 7.5 liter reactor were added aqueous surfactant solution, initiator solution, antifoulant, and additional water. After the additions, the amounts of the components in the reactor were 5.1 g of PCL, 4.2 g of paraffin wax, 12.1 g of Ethyl Acetate and 4400 g of deionized water. The reactor was purged of air by using a low flow of argon for 30 minutes and agitation at 18 rpm. After the purge, the agitation was increased to 72 rpm, and the reactor temperature was brought to 83 degrees Celsius. When the temperature stabilized, vinylidene fluoride was added to the reactor to bring the pressure to 650 psig. A feed of initiator solution was begun at 360 g/hour until 90 g of the 1 wt % initiator solution was added. Vinylidene fluoride was added as necessary to maintain the reactor pressure. After 2242 g of vinylidene fluoride had been added to the reactor, the feed of vinylidene fluoride was stopped. A 20 minutes reactout period was begun during which the reactor was kept at 83 C for another, but agitation was reduced to 50 rpm. The agitation was then stopped, the reactor was cooled and vented of surplus vinylidene fluoride. The reaction time was 160 minutes. A stable latex was collected, and its solids content was 35.0 wt %.

What is claimed is:

1. A process for preparing a fluoropolymer in an aqueous reaction medium comprising:
   a) forming an aqueous emulsion comprising at least one radical initiator, at least one polycaprolactone polymer or salt thereof, and at least one fluoromonomer, and
   b) initiating polymerization of said fluoromonomer.

2. The process of claim 1, wherein the process uses no surfactant.

3. The process of claim 1, wherein said polycaprolactone polymer is used in combination with at least one surfactant.

4. The process of claim 3, wherein said surfactant is selected from the group consisting of sodium octyl sulfonate, sodium lauryl sulfate, ammonium lauryl sulfate, sodium laureth sulfate or mixtures thereof.

5. The process of claim 1 wherein said polycaprolactone is a copolymer comprising at least 75 weight percent of caprolactone units and 1 to 25 weight percent of monomer units of at least one other monomer.

6. The process of claim 1 wherein said polycaprolactone have a molecular weight comprised between 200 and 300,000.

7. The process of claim 1 wherein said polycaprolactone is present in an amount from about 0.001 to about 2.0 weight percent on total monomer.

8. The process of claim 1 wherein said at least one fluoromonomer is selected from the group consisting of vinylidene fluoride, hexafluoropropene, tetrafluoroethylene, trifluoroethylene, chlorotrifluoroethylene, vinyl fluoride, and combinations thereof.

9. The process of claim 1 wherein said at least one fluoromonomer comprises vinylidene fluoride.

10. The process of claim 1 wherein said fluoropolymer is a vinylidene fluoride copolymer comprising at least one comonomer selected from the group consisting of tetrafluoroethylene, trifluoroethylene, hexafluoropropene, chlorotrifluoroethylene, vinyl fluoride, and combinations thereof.

11. The process of claim 7 wherein said polycaprolactone is present in an amount from about 0.001 to about 0.2 weight percent on total monomer.

* * * * *